(12) United States Patent
Uehara et al.

(10) Patent No.: US 10,988,634 B2
(45) Date of Patent: Apr. 27, 2021

(54) MIXED COMPOSITION

(71) Applicant: SUMITOMO CHEMICAL COMPANY, LIMITED, Tokyo (JP)

(72) Inventors: Michiru Uehara, Osaka (JP); Tomonori Miyamoto, Osaka (JP); Yasuharu Shimazaki, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/770,857

(22) PCT Filed: Mar. 29, 2019

(86) PCT No.: PCT/JP2019/014075
§ 371 (c)(1),
(2) Date: Jun. 8, 2020

(87) PCT Pub. No.: WO2019/189793
PCT Pub. Date: Oct. 3, 2019

(65) Prior Publication Data
US 2020/0392373 A1    Dec. 17, 2020

(30) Foreign Application Priority Data

Mar. 30, 2018  (JP) .............................. JP2018-070163

(51) Int. Cl.
*C09D 183/06* (2006.01)
*C09D 7/63* (2018.01)
*C08G 77/18* (2006.01)
*C08K 5/092* (2006.01)

(52) U.S. Cl.
CPC ........... *C09D 183/06* (2013.01); *C08G 77/18* (2013.01); *C09D 7/63* (2018.01); *C08K 5/092* (2013.01)

(58) Field of Classification Search
CPC ........ C07F 7/1804; C07F 7/1896; C07F 7/12; C07F 7/045; C07C 53/00; C07C 55/00; C07C 55/02; C07C 55/22; C07C 55/24; C07C 57/13; C07C 63/307; C07C 63/313
See application file for complete search history.

(56) References Cited

U.S. PATENT DOCUMENTS 5,391,673 A * 2/1995 Ekeland .................. C08G 77/04
528/12
2014/0235733 A1* 8/2014 Heinz .................. C12N 9/0083
514/784

FOREIGN PATENT DOCUMENTS

| JP | H05-230375 A | 9/1993 |
| JP | 2010-117439 A | 5/2010 |
| JP | 2011-006539 A | 1/2011 |
| JP | 2017-201008 A | 11/2017 |
| WO | WO-2016/068103 A1 | 5/2016 |

OTHER PUBLICATIONS

Japanese Patent Office, "Notice of Reasons for Refusal," issued in connection with Japanese Patent Application No. 2019-069944, dated Jun. 2, 2020.
International Searching Authority, "Written Opinion," issued in connection with International Patent Application No. PCT/JP2019/014075, dated Jul. 2, 2019.
International Searching Authority, "International Search Report," issued in connection with International Patent Application No. PCT/JP2019/014075, dated Jul. 2, 2019.

\* cited by examiner

*Primary Examiner* — Kuo Liang Peng
(74) *Attorney, Agent, or Firm* — Foley & Lardner LLP

(57) ABSTRACT

A mixed composition comprising an organosilicon compound represented by the following formula (a1), a solvent, water, and a carboxylic acid compound, wherein a mass ratio of the water to the organosilicon compound is 30.0 or more. In the following formula (a1), a plurality of $A^{a1}$ each independently represent a hydrolyzable group, $Z^{a1}$ represents a hydrocarbon chain-containing group, x is 0 or 1. $R^{a10}$ represents an alkyl group having 6 to 20 carbon atoms in which a part of methylene groups may be replaced with an oxygen atom and one or more hydrogen atoms may be replaced with a fluorine atom, and $Z^{a1}$ and $R^{a10}$ may be the same or different.

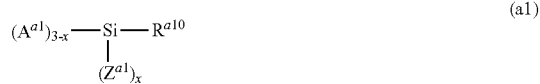

(a1)

15 Claims, No Drawings

MIXED COMPOSITION

CROSS-REFERENCE TO RELATED APPLICATIONS

The present application claims priority under 37 U.S.C. § 371 to International Patent Application No. PCT/JP2019/014075, filed Mar. 29, 2019, which claims priority to and the benefit of Japanese Patent Application No. 2018-070163, filed on Mar. 30, 2018. The contents of these applications are hereby incorporated by reference in their entireties.

TECHNICAL FIELD

The present invention relates to a mixed composition comprising an organosilicon compound, a solvent, water, and a carboxylic acid compound.

BACKGROUND ART

In various display devices, optical elements, semiconductor elements, building materials, automobile parts, nanoimprint technology, and the like, there are cases in which problems, such as contamination or corrosion of a base material, and further a deterioration in performance caused by such contamination or corrosion, arise due to droplets adhering to the surface of the base material. Therefore, in these fields, the surface of the base material is required to have good water repellency.

As a composition that can realize a water-repellent coating, Patent Literature 1 or 2 discloses a composition including an organosilicon compound. Compositions that include organosilicon compounds, which are highly likely to react with moisture in the air, tend to deteriorate when stored for a long period of time. Therefore, it is required to have good storage stability and that quality does not deteriorate even after the composition is stored for a long period of time.

As a technique for improving the storage stability of a composition including an organosilicon compound, for example, Patent Literature 3 discloses a binary liquid mixture composition of a precursor (A), which is a compound group combining two or more liquid organosiloxanes composed of an $R^1$—Si group ($R^1$ is a monovalent hydrocarbon group) as an organosilicon group and an $OR^2$ group ($R^2$ is a hydrogen atom, or a $C_1$ to $C_5$ alkyl group or acyl group) as a functional side chain, and a crosslinking agent (B). Patent Literature 3 describes that the storage stability of the composition is improved by blocking the crosslinking agent (B) with a keto-enol type tautomeric compound, such as a malonic acid diester or acetylacetone, in advance.

CITATION LIST

Patent Literature

Patent Literature 1: International Publication No. WO 2016/068103
Patent Literature 2: Japanese Patent Laid-Open No. 2017-201008
Patent Literature 3: Japanese Patent Laid-Open No. 5-230375

SUMMARY OF INVENTION

Technical Problem

Although Patent Literature 3 describes the storage stability of a composition for forming a coating, investigation by the present inventors showed that the storage stability of the composition disclosed in Patent Literature 3 could not be said to be sufficient.

Moreover, there are various environments in which coatings are formed using the above composition, and for example, it is required that a good coating can be formed not only under normal humidity of about 40% relative humidity, but also under high humidity of about 70% relative humidity.

Therefore, it is an object of the present invention to provide a composition obtained by mixing an organosilicon compound, which can form a good coating not only under normal humidity but also under high humidity, and which has also excellent storage stability.

Solution to Problem

The present invention includes the following inventions.

[1] A mixed composition comprising:

an organosilicon compound (A) represented by the following formula (a1);

a solvent (C);

water (D); and a carboxylic acid compound (E), wherein the mixed composition has a mass ratio (D/A) of the water (D) to the organosilicon compound (A) of 30.0 or more

[Formula 1]

(wherein a plurality of $A^{a1}$ each independently represent a hydrolyzable group; $Z^{a1}$ represents a hydrocarbon chain-containing group; x is 0 or 1; $R^{a10}$ represents an alkyl group having 6 to 20 carbon atoms, a part of methylene groups constituting the alkyl group may be replaced with an oxygen atom, and one or more hydrogen atoms may be replaced with a fluorine atom; and $Z^{a1}$ and $R^{a10}$ may be the same or different).

[2] The composition according to [1], wherein the organosilicon compound (A) is a compound represented by the following formula (a1-2)

(wherein a plurality of $A^{a1}$ each independently represent a hydrolyzable group, and $R^{a11}$ represents an alkyl group having 6 to 20 carbon atoms in which a hydrogen atom may be substituted with a fluorine atom).

[3] The composition according to [1] or [2], wherein the solvent (C) is an alcohol solvent.

[4] The composition according to any of [1] to [3], wherein a mass ratio (D/C) of the water (D) to the solvent (C) is 0.1 or more.

[5] The composition according to any of [1] to [4], wherein the carboxylic acid compound (E) is a polyvalent carboxylic acid compound.

[6] The composition according to any of [1] to [5], wherein the carboxylic acid compound (E) is a compound represented by the following formula (e1)

[Formula 2]

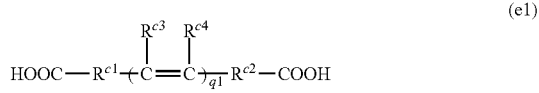

(wherein $R^{c1}$ and $R^{c2}$ are each independently represent a single bond, a divalent aliphatic hydrocarbon group having 1 to 10 carbon atoms optionally having a carboxy group, or a divalent aromatic hydrocarbon group having 6 to 10 carbon atoms optionally having a carboxy group; $R^{c3}$ and $R^{c4}$ each independently represent an alkyl group having 1 to 10 carbon atoms optionally having a carboxy group, or a hydrogen atom; and $q^1$ is 0 or 1).

[7] The composition according to any of [1] to [6], wherein a metal compound (B) represented by the following formula (b1)

$$M(R^{b10})_r(A^{b1})_{m-r} \quad (b1)$$

(wherein M represents Al, Fe, In, Ge, Hf, Si, Ti, Sn, Zr, or Ta, $R^{b10}$ represents a hydrocarbon chain-containing group having 1 to 5 carbon atoms, r is 0 or 1; a plurality of $A^{b1}$ each independently represent a hydrolyzable group, and m denotes an integer of 3 to 5 depending on the metal atom M) is mixed.

[8] An absorbent body comprising the mixed composition according to any of [1] to [7] in an exudable manner.

[9] A film obtained by curing the mixed composition according to any of [1] to [7].

[10] The film according to [9], comprising the carboxylic acid compound (E).

[11] The film according to [9] or [10], wherein a sliding speed of a water droplet is 90.0 mm/sec or more.

Advantageous Effects of Invention

Since the composition of the present invention uses an organic silicon compound as a raw material and mixes a predetermined amount of water with respect to the organic silicon compound, a coating having good water droplet sliding properties and good transparency can be formed under both normal and high humidity environments. Further, the composition of the present invention is obtained by further mixing a carboxylic acid compound, and therefore has good storage stability and can suppress deterioration in the performance of a coating obtained from the composition after storage for a certain period of time at normal temperature under normal humidity.

DESCRIPTION OF EMBODIMENTS

The composition of the present invention is a mixed composition of an organosilicon compound (A) including a hydrolyzable group and an alkyl group, a solvent (C), water (D), and a carboxylic acid compound (E), characterized by the point that a mass ratio (D/A) of the water (D) to the organosilicon compound (A) satisfies a predetermined relationship. A coating formed using such a composition by hydrolysis and polycondensation of the hydrolyzable group has water repellency due to the above-mentioned alkyl group. In addition, by including a predetermined amount of water with respect to the organosilicon compound, a coating having good water droplet sliding properties and transparency can be formed under both normal humidity and high humidity. Furthermore, the presence of the carboxylic acid compound (E) can moderate the hydrolysis and polycondensation reactions of the hydrolyzable group bonded to the silicon atom, thus making it possible to improve the storage stability of the composition. In the following, the mixed composition is sometimes simply referred to as the composition.

The organosilicon compound (A), the solvent (C), the water (D), and the carboxylic acid compound (E) are now described in order. The mixed composition includes products obtained by a reaction in which any of the components of the composition undergo a hydrolysis, polycondensation, or other such reaction.

1. Organosilicon Compound (A)

The organosilicon compound (A) in the present invention is a compound represented by the following formula (a1). The organosilicon compound (A) may undergo a reaction such as hydrolysis or condensation in the mixed composition.

[Formula 3]

In the formula (a1), a plurality of $A^{a1}$ each independently represent a hydrolyzable group. $Z^{a1}$ represents a hydrocarbon chain-containing group, and x is 0 or 1. $R^{a10}$ represents an alkyl group having 6 to 20 carbon atoms, in which a part of methylene groups constituting the alkyl group may be replaced with an oxygen atom, and one or more hydrogen atoms may be replaced with a fluorine atom. $Z^{a1}$ and $R^{a10}$ may be the same or different. Further, among a plurality of the formulas (a1), $Z^{a1}$ and $R^{a10}$ may be the same or different.

$A^{a1}$ represents a hydrolyzable group, and a plurality of $A^{a1}$ may be the same or different.

The hydrolyzable group of $A^{a1}$ may be any group that gives a hydroxy group (silanol group) by hydrolysis. Examples thereof include an alkoxy group having 1 to 6 carbon atoms, such as a methoxy group, an ethoxy group, a propoxy group, and a butoxy group; a hydroxy group; an acetoxy group; a chlorine atom; and an isocyanate group. Among these, an alkoxy group having 1 to 6 carbon atoms is preferable, an alkoxy group having 1 to 4 carbon atoms is more preferable, and an alkoxy group having 1 or 2 carbon atoms is further preferable.

It is further preferable that the plurality of $A^{a1}$ are all the same.

$Z^{a1}$ is a hydrocarbon chain-containing group. The hydrocarbon chain-containing group means a group having a hydrocarbon chain in at least a part thereof.

The hydrocarbon chain-containing group of $Z^{a1}$ usually consists of only a hydrocarbon group (a hydrocarbon chain), but a part of the methylene groups (—$CH_2$—) of the hydrocarbon chain may be replaced with an oxygen atom as needed. Even in such a case, namely, even if a part of the methylene groups are substituted with an oxygen atom, because a hydrocarbon chain is present in the remaining portion, the compound is classified as a hydrocarbon chain-containing group. It should be noted that the methylene group adjacent to the Si atom is not replaced with an oxygen atom, and two consecutive methylene groups are not simultaneously replaced with an oxygen atom.

The number of carbon atoms in the hydrocarbon chain moiety of $Z^{a1}$ is preferably 1 or more and 20 or less, more preferably 1 or more and 10 or less, and further preferably 1 or more and 5 or less. In particular, it is preferable that $Z^{a1}$ is a hydrocarbon group having a carbon number within the above range. The number of carbon atoms in the hydrocarbon chain moiety means, for a non-oxygen-substituted hydrocarbon chain-containing group, the number of carbon atoms constituting the hydrocarbon group (hydrocarbon chain), and for an oxygen-substituted hydrocarbon chain-containing group, the number of carbon atoms as counted when the oxygen atom is assumed to be a methylene group.

Further, the longest chain length of the hydrocarbon chain moiety of $Z^{a1}$ is preferably shorter than the longest chain length of $R^{a10}$ to be described later, and at this time $Z^{a1}$ is more preferably a hydrocarbon group.

$Z^{a1}$ is preferably a saturated or unsaturated aliphatic hydrocarbon group, and more preferably a straight-chain saturated aliphatic hydrocarbon group. The straight-chain saturated aliphatic hydrocarbon group may be, for example, a methyl group, an ethyl group, a propyl group, a butyl group, and a pentyl group.

When a part of the methylene groups of the hydrocarbon chain are replaced with an oxygen atom, the hydrocarbon chain-containing group is preferably a saturated aliphatic hydrocarbon group. Specific examples thereof include a group having a (poly)ethylene glycol unit.

x denotes 0 or 1, and 0 is preferable.

$R^{a10}$ is an alkyl group having 6 to 20 carbon atoms in which a part of the methylene groups may be replaced with an oxygen atom and one or more hydrogen atoms may be replaced with a fluorine atom. This alkyl group confers water repellency to the surface of the obtained coating. In particular, the coefficient of friction between a droplet such as water droplet and the coating decreases, and the droplets move more easily.

$R^{a10}$ usually consists of only a hydrocarbon chain, but a part of the methylene groups (—$CH_2$—) of the hydrocarbon chain may be replaced with an oxygen atom, or a hydrogen atom may be replaced with a fluorine atom as needed. Similar to the case of $Z^{a1}$ described above, the methylene group adjacent to the Si atom is not replaced with an oxygen atom, and two consecutive methylene groups are not simultaneously replaced with an oxygen atom.

The number of carbon atoms in $R^{a10}$ is preferably 7 or more, and more preferably 8 or more, and is preferably 19 or less, and more preferably 15 or less.

$R^{a10}$ may be a branched chain or a straight chain, but is preferably a straight chain.

Examples of $R^{a10}$ include a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group.

Examples of an alkyl group in which a part of the methylene groups (—$CH_2$—) of the hydrocarbon chain are replaced with an oxygen atom include a group having a (poly)ethylene glycol unit and a group having a (poly)propylene glycol unit.

An example of an alkyl group in which one or more hydrogen atoms are replaced with a fluorine atom includes a fluoroalkyl group having a terminal trifluoromethyl.

In the above formula (a1), the above $Z^{a1}$ and $R^{a10}$ may be the same or different.

The organosilicon compound (A) represented by the above formula (a1) is preferably a compound in which $R^{a10}$ is an alkyl group having 6 to 20 carbon atoms in which a hydrogen atom may be substituted with a fluorine atom, and x is 0. That is, a preferable organosilicon compound (A) can be represented by the following formula (a1-2). In the following formula (a1-2), a plurality of $A^{a1}$ each independently represent a hydrolyzable group, and $R^{a11}$ represents an alkyl group having 6 to 20 carbon atoms in which a hydrogen atom may be substituted with a fluorine atom.

$$(A^{a1})_3\text{—Si—}R^{a11} \qquad (a1\text{-}2)$$

Among the compounds represented by the above formula (a1-2), in particular, $R^{a11}$ is preferably an unsubstituted alkyl group in which a hydrogen atom is not substituted with a fluorine atom, and further, the three $A^{a1}$ are preferably all the same hydrolyzable group. Examples of such an organosilicon compound (A) include alkyltrialkoxysilanes having an alkyl group having 6 to 20 carbon atoms, such as alkyltrimethoxysilane having an alkyl group having 6 to 20 carbon atoms and alkyltriethoxysilane having an alkyl group having 6 to 20 carbon atoms; alkyltrihydroxysilanes having an alkyl group having 6 to 20 carbon atoms; alkyltriacetoxysilanes having an alkyl group having 6 to 20 carbon atoms; alkyltrichlorosilanes having an alkyl group having 6 to 20 carbon atoms; and alkyltriisocyanatesilanes having an alkyl group having 6 to 20 carbon atoms. Among these, an alkyltrialkoxysilane having an alkyl group having 6 to 20 carbon atoms is preferable, and alkyltrimethoxysilane having an alkyl group having 6 to 20 carbon atoms and alkyltriethoxysilane having an alkyl group having 6 to 20 carbon atoms are more.

The composition of the present invention may be a mixture of two or more compounds represented by the above formula (a1).

2. Solvent (C)

The solvent (C) means a solvent other than water. Examples thereof include alcohol solvents, ether solvents, ketone solvents, ester solvents, and amide solvents. Examples of the alcohol solvents include methanol, ethanol, propanol, butanol, ethylene glycol, propylene glycol, and diethylene glycol. Examples of the ether solvents include dimethoxyethane, tetrahydrofuran, and dioxane. Examples of the ketone solvents include acetone and methyl ethyl ketone (2-butanone). Examples of the ester solvents include ethyl acetate and butyl acetate. Examples of the amide solvents include dimethylformamide. Among these, the alcohol solvent or ether solvent is preferable, and the alcohol solvent is more preferable.

3. Water (D)

The composition of the present invention includes water (D) together with the above-mentioned organosilicon compound (A) and solvent (C). By including the water (D), a coating having good water droplet sliding properties and transparency can be formed not only under normal humidity, but also under high humidity environment. That is, by using the composition of the present invention, for example, a coating having high water repellency, good water droplet sliding properties, and transparency even under high humidity of about 70% relative humidity, can be formed. As the water (D), natural water, tap water, distilled or purified water, or the like can be used. The water (D) may include impurities within a range that does not affect the coating formed from the composition.

The composition of the present invention has a mass ratio (D/A) of the water (D) to the organosilicon compound (A) of 30.0 or more. When the mass ratio (D/A) is less than 30.0, it becomes more difficult to form a film under high humidity.

The mass ratio (D/A) is preferably 50 or more, more preferably 100 or more, further preferably 1000 or more, and particularly preferably 2000 or more. The upper limit of the mass ratio (D/A) is not particularly limited, and is, for example, preferably 20000 or less, more preferably 15000 or less, and further preferably 10000 or less. The mass ratio may be calculated from the amount ratio used for preparing the composition, or may be the amount ratio calculated by analyzing the composition.

The composition of the present invention has a mass ratio (D/C) of the water (D) to the solvent (C) of preferably 0.1 or more. By setting the mass ratio (D/C) to 0.1 or more, the amount of water relative to the solvent increases, which allows the composition to be handled more safely. The mass ratio (D/C) is more preferably 0.2 or more, further preferably 0.3 or more, and particularly preferably 0.5 or more. The upper limit of the mass ratio (D/C) is not particularly limited, and is preferably 2.0 or less, more preferably 1.5 or less, and further preferably 1.3 or less. The mass ratio may be calculated from the amount ratio used for preparing the composition, or may be the amount ratio calculated by analyzing the composition.

4. Carboxylic Acid Compound (E)

The composition of the present invention is a mixture of the above-mentioned organosilicon compound (A), solvent (C), water (D), and carboxylic acid compound (E). By mixing the carboxylic acid compound (E), it is possible to suppress hydrolysis and polycondensation reactions of the hydrolyzable group bonded to a silicon atom or a metal atom to be described later, which allows a deterioration in storage stability caused by the composition turning into a gel to be suppressed.

The carboxylic acid compound (E) means a compound having at least one carboxy group, and may be either a monovalent carboxylic acid compound or a polyvalent carboxylic acid compound (carboxylic acid compound having two or more carboxy groups). However, a polycarboxylic acid compound is preferable. More preferably, the polyvalent carboxylic acid compound is oxalic acid in which two carboxy groups are directly bonded, or a polyvalent carboxylic acid compound (in particular, dicarboxylic acid, tricarboxylic acid, or tetracarboxylic acid) in which a carboxy group is bonded to both ends of a divalent hydrocarbon group, and in which the main chain (longest straight chain) of the hydrocarbon group has 1 to 15 carbon atoms (more preferably 1 to 5 carbon atoms, further preferably 1 to 4 carbon atoms, still further preferably 1 to 3 carbon atoms, and particularly preferably 1 or 2 carbon atoms). At this time, the divalent hydrocarbon group may be a straight chain or a branched chain, may be an aliphatic hydrocarbon group or an aromatic hydrocarbon group, and may be a saturated hydrocarbon group or an unsaturated hydrocarbon group. Further, a hydroxy group or a carboxy group may be bonded to the carbon atoms other than those at both ends of the hydrocarbon group.

Examples of the carboxylic acid compound (E) include dicarboxylic acids such as oxalic acid, malonic acid, succinic acid, maleic acid, fumaric acid, glutaric acid, adipic acid, pimelic acid, tartaric acid, malic acid, phthalic acid, itaconic acid, muconic acid, 1,4-cyclohexanedicarboxylic acid, 1,4-naphthalenedicarboxylic acid, 2,6-naphthalenedicarboxylic acid, 2,7-naphthalenedicarboxylic acid, and 4,4'-biphenyldicarboxylic acid; tricarboxylic acids such as citric acid, aconitic acid, trimellitic acid, trimesic acid, biphenyl-3,4',5-tricarboxylic acid, and tricarballylic acid; and tetracarboxylic acids such as butanetetracarboxylic acid. More preferably, the carboxylic acid compound (E) is oxalic acid, or a dicarboxylic acid or tricarboxylic acid in which a carboxy group is bonded at both ends of a saturated or unsaturated straight-chain hydrocarbon group having 1 to 3 carbon atoms (particularly 1 or 2 carbon atoms). As the carboxylic acid compound (E), specifically, oxalic acid, malonic acid, succinic acid, maleic acid, glutaric acid, tricarballylic acid, and the like are preferable, and oxalic acid, malonic acid, succinic acid, maleic acid, tricarballylic acid are more preferable.

The carboxylic acid compound (E) may also be a polymer having at least one carboxy group in the molecule. Examples of such a polymer include polymers including a structural unit having a carboxy group in a side chain, and may include a structural unit having a carboxy group in two or more side chains. Examples of the polymer having at least one carboxy group in the molecule include (meth)acrylic polymers having a carboxy group, polyester polymers having a carboxy group, and polyolefin polymers having a carboxy group.

The carboxylic acid compound (E) preferably has a molecular weight of 1000 or less, and more preferably 500 or less. The molecular weight is preferably 50 or more, and more preferably 80 or more.

The carboxylic acid compound (E) is preferably a compound represented by the following formula (e1).

[Formula 4]

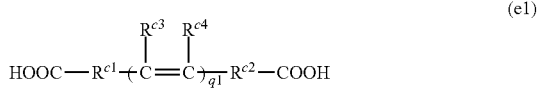

(e1)

In the formula (e1), $R^{c1}$ and $R^{c2}$ are each independently represent a single bond, a divalent aliphatic hydrocarbon group having 1 to 10 carbon atoms optionally having a carboxy group, or a divalent aromatic hydrocarbon group having 6 to 10 carbon atoms optionally having a carboxy group. $R^{c3}$ and $R^{c4}$ each independently represent an alkyl group having 1 to 10 carbon atoms optionally having a carboxy group, or a hydrogen atom. $q^1$ is 0 or 1.

The divalent aliphatic hydrocarbon group having 1 to 10 carbon atoms represented by $R^{c1}$ and $R^{c2}$ may be a straight chain, a branched chain, or cyclic. Specific examples thereof include alkanediyl groups such as a methylene group, an ethylene group, a propylene group, and a butylene group.

Examples of the divalent aromatic hydrocarbon group having 6 to 10 carbon atoms represented by $R^{c1}$ and $R^{c2}$ include a phenylene group.

The divalent aliphatic hydrocarbon group or divalent aromatic hydrocarbon group represented by $R^{c1}$ and $R^{c2}$ may have a carboxy group.

$R^{c1}$ is preferably a single bond or a divalent aliphatic hydrocarbon group having 1 to 10 carbon atoms optionally having a carboxy group. More preferably, $R^{c1}$ is a single bond or a divalent straight-chain aliphatic hydrocarbon group having 1 to 10 carbon atoms optionally having a carboxy group. $R^{c2}$ is preferably a single bond.

The alkyl group having 1 to 10 carbon atoms represented by $R^{c3}$ and $R^{c4}$ may be a straight chain, a branched chain, or cyclic. Specific examples thereof include a methyl group, an ethyl group, a propyl group, and a butyl group.

$R^{c3}$ is preferably a hydrogen atom. $R^{c4}$ is preferably a hydrogen atom.

Further preferably, the compound represented by the formula (e1) is a compound represented by the following formula (e2). In the following formula (e2), p denotes an integer of 0 to 2.

[Formula 5]

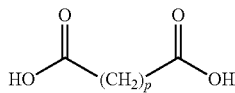

(e2)

Preferably, p is 1.

The composition of the present invention may include two or more of the above carboxylic acid compound (E).

5. Metal Compound (B)

The composition of the present invention is preferably a composition obtained by further mixing, in addition to the organosilicon compound (A) described above, the solvent (C), the water (D), and the carboxylic acid compound (E), a metal compound (B) represented by the following formula (b1).

(b1)

In the formula (b1), M represents Al, Fe, In, Ge, Hf, Si, Ti, Sn, Zr, or Ta. $R^{b10}$ represents a hydrocarbon chain-containing group having 1 to 5 carbon atoms, and r is 0 or 1. A plurality of $A^{b1}$ each independently represent a hydrolyzable group, and m denotes an integer of 3 to 5 depending on the metal atom M.

As represented by the formula (b1), the metal compound (B) is a compound in which a hydrolyzable group $A^{b1}$ is bonded to the metal atom M. In the present specification, the term "metal" is used in a sense that includes semimetals such as Si and Ge.

As described above, a coating obtained from the composition of the present invention has a higher water-repellency function due to the alkyl group having 6 to 20 carbon atoms derived from the organosilicon compound (A), and it is considered that the metal element M, which is not bonded to such an alkyl group-containing molecular chain, functions as a spacer in the coating.

Preferably, M is at least one selected from the group consisting of Al, Si, Ti, Sn and Zr, more preferably at least one selected from the group consisting of Al, Si, Ti and Zr, and further preferably Si.

$R^{b10}$ is a group having a hydrocarbon chain in at least a portion thereof and having 1 to 5 carbon atoms.

The hydrocarbon chain-containing group of $R^{b10}$ usually consists of only a hydrocarbon group (a hydrocarbon chain), but a part of the methylene groups of the hydrocarbon chain may be replaced with an oxygen atom as needed. It should be noted that the methylene group adjacent to the metal atom M is not replaced with an oxygen atom, and two consecutive methylene groups are not simultaneously replaced with an oxygen atom.

The number of carbon atoms in the hydrocarbon chain moiety of $R^{b10}$ is preferably 4 or less.

Further, $R^{b10}$ is preferably a saturated or unsaturated aliphatic hydrocarbon group, and more preferably a straight-chain saturated aliphatic hydrocarbon group. Examples of the straight-chain saturated aliphatic hydrocarbon group include a methyl group, an ethyl group, a propyl group, a butyl group, and a pentyl group, and a methyl group, an ethyl group, a propyl group, and a butyl group are particularly preferable.

When a part of the methylene groups of the hydrocarbon chain are replaced with an oxygen atom, the hydrocarbon chain-containing group is preferably a saturated aliphatic hydrocarbon group. Specific examples thereof include a group having a (poly)ethylene glycol unit.

Preferably, r is 0.

$A^{b1}$ represents a hydrolyzable group, and a plurality of $A^{b1}$ may be the same or different.

The hydrolyzable group of $A^{b1}$ may be any group that gives a hydroxy group (silanol group) by hydrolysis, and is preferably an alkoxy group having 1 to 6 carbon atoms, more preferably an alkoxy group having 1 to 4 carbon atoms, and further preferably a methoxy group or an ethoxy group. In these cases, it is particularly preferable that the plurality of $A^{b1}$ are the same.

m is the valence of the metal atom M. When the metal atom M is a trivalent metal such as Al, Fe, or In, m is 3. When the metal atom M is a tetravalent metal such as Ge, Hf, Si, Ti, Sn, or Zr, m is 4. When the metal atom M is a pentavalent metal such as Ta, m is 5.

The composition of the present invention may be a composition obtained by mixing two or more of the metal compound (B).

Examples of the metal compound (B) include a metal compound B1 in which r=0, that is, only a hydrolyzable group $A^{b1}$ is bonded to the metal atom M; or a metal compound B2 in which r=1, that is, one hydrogen chain-containing group $R^{b10}$ having 1 to 5 carbon atoms and two or more hydrolyzable groups $A^{b1}$ are bonded to the metal atom M.

(Metal Compound B1)

Specific examples of the metal compound B1 in which only the hydrolyzable group $A^{b1}$ is bonded to the metal atom M include: trialkoxy aluminums, such as triethoxy aluminum, tripropoxy aluminum, and tributoxy aluminum; trialkoxy irons, such as triethoxy iron; trialkoxy indiums, such as trimethoxy indium, triethoxy indium, tripropoxy indium, and tributoxy indium; tetraalkoxy germaniums, such as tetramethoxy germanium, tetraethoxy germanium, tetrapropoxy germanium, and tetrabutoxy germanium; tetraalkoxy hafniums, such as tetramethoxy hafnium, tetraethoxy hafnium, tetrapropoxy hafnium, and tetrabutoxy hafnium; tetraalkoxysilanes, such as tetramethoxysilane, tetraethoxysilane, tetrapropoxysilane, and tetrabutoxysilane; tetraalkoxy titaniums, such as tetramethoxy titanium, tetraethoxy titanium, tetrapropoxy titanium, and tetrabutoxy titanium; tetraalkoxy tins, such as tetramethoxy tin, tetraethoxy tin, tetrapropoxy tin, and tetrabutoxy tin; tetraalkoxy zirconiums, such as tetramethoxy zirconium, tetraethoxy zirconium, tetrapropoxy zirconium, and tetrabutoxy zirconium; and pentaalkoxy tantalums such as pentamethoxy tantalum, pentaethoxy tantalum, pentapropoxy tantalum, pentabutoxy tantalum.

(Metal Compound B2)

The metal compound B2, in which one hydrocarbon chain-containing group $R^{b10}$ having 1 to 5 carbon atoms and two or more hydrolyzable groups $A^{b1}$ are bonded to the metal atom M, is preferably metal in which the metal atom M is a tetravalent metal (Ge, Hf, Si, Ti, Sn, Zr, etc.). Specific examples when the metal atom M is Si include: alkyltrialkoxysilanes, such as methyltrimethoxysilane, ethyltrimethoxysilane, methyltriethoxysilane, ethyltriethoxysilane, and methyltripropoxysilane; and alkenyltrialkoxysilanes, such as vinyltrimethoxysilane and vinyltriethoxysilane.

As the metal compound (B), the metal compound B1 is preferable, and specifically, a compound represented by the following formula (b2) is preferable. In the formula (b2) below, $R^{b11}$ is an alkyl group having 1 to 5 carbon atoms.

$R^{b11}$ is preferably an alkyl group having 1 to 4 carbon atoms, and more preferably a methyl group or an ethyl group.

The composition of the present invention preferably has a mass ratio [E/(A+B)] of the carboxylic acid compound (E) to the total (A+B) of the organosilicon compound (A) and the metal compound (B) of 0.001 to 0.2. The mass ratio [E/(A+B)] is more preferably 0.002 or more, and further preferably 0.005 or more, and is more preferably 0.20 or less, and further preferably 0.15 or less. The mass ratio may be calculated from the amount ratio used for preparing the composition, or may be the amount ratio calculated by analyzing the composition. It is noted that in the present specification, the mass ratio and mole ratio can be calculated from the amounts of the composition blended during the preparation as described above or from the analysis results of the composition.

An example of a preferable mode of the mixed composition of the present invention is a composition obtained using a compound represented by the formula (a1-2) as the organosilicon compound (A), a compound represented by the formula (b2) as the metal compound (B), an alcohol solvent as the solvent (C), and a dicarboxylic acid in which a carboxy group is bonded to both ends of a saturated or unsaturated straight-chain hydrocarbon group having 1 to 3 carbon atoms as the carboxylic acid compound (E), and further mixing with water (D).

In the composition of the present invention, it is preferable that a catalyst (F) including water is also present. As the catalyst (F), a catalyst generally used in a sol-gel method can be used. For example, the catalyst may be selected from among inorganic acid catalysts such as hydrochloric acid, organic acid catalysts other than carboxylic acid compounds, basic catalysts, organometallic catalysts, and the like. The catalyst (F) is preferably an inorganic acid catalyst, and it is particularly preferable to use an inorganic acid catalyst having an acid dissociation constant pKa of 5 or less (for example, hydrochloric acid).

To prepare the composition of the present invention, for example, it is preferable to add a catalyst (F) including water to the organosilicon compound (A) and the optionally-added metal compound (B) (at this point, the organosilicon compound (A) and the metal compound (B) are hydrolyzed by the catalyst (F) including water to form a hydrolyzed condensate), stir, the mixture for about 30 minutes to 3 hours, and then add the carboxylic acid compound (E) and mix for about 2 to 30 hours. The organosilicon compound (A) and the optionally-added metal compound (B) may be dissolved in the solvent (C) in advance. As the carboxylic acid compound (E), a carboxylic acid compound solution may be prepared by dissolving the carboxylic acid compound (E) in the solvent (C) in advance, and that solution may be added.

Next, the solid content concentration of the organosilicon compound (A), the optionally-added metal compound (B), and the carboxylic acid compound (E) can be adjusted by adding a mixed solution of the solvent (C) and the water (D).

The composition of the present invention preferably has a total solid content concentration (A+B) of the organosilicon compound (A) and the metal compound (B) of 0.02 to 1.5% by mass based on 100% by mass of the composition. The total (A+B) is more preferably 0.03% by mass or more, and further preferably 0.04% by mass or more, and is more preferably 1.3% by mass or less, and further preferably 1.0% by mass or less.

The composition of the present invention preferably has a total solid content concentration (A+B+E) of the organosilicon compound (A), the metal compound (B), and the carboxylic acid compound (E) of 0.02 to 2.0% by mass based on 100% by mass of the composition. The total (A+B+E) is more preferably 0.03% by mass or more, and further preferably 0.04% by mass or more, and is more preferably 1.5% by mass or less, and further preferably 1% by mass or less.

The composition of the present invention preferably has a total solid content concentration (A+E) of the organosilicon compound (A) and the carboxylic acid compound (E) of 0.001 to 0.7% by mass based on 100% by mass of the composition. The total (A+E) is more preferably 0.007% by mass or more, and is more preferably 0.5% by mass or less.

The composition of the present invention may contain, within a range that does not harm the effect of the present invention, for example, various additives such as an antioxidant, a rust preventive, an ultraviolet absorber, a light stabilizer, a fungicide, an antibacterial agent, a biofouling inhibitor, a deodorant, a pigment, a flame retardant, and an antistatic agent.

The composition of the present invention can form a coating having good water droplet sliding properties as evaluated by the sliding angle of the water droplet and good transparency as evaluated by the haze of the coating not only under normal humidity in which relative humidity is 35% or more and less than 65% (particularly 40%), but even under high humidity in which relative humidity is 65% or more and 85% or less (particularly 70%). Further, since the composition of the present invention has good storage stability, the composition of the present invention can form a coating having good water droplet sliding properties and good transparency under normal humidity as well as under high humidity even when the coating is formed after being stored, for example, at normal temperature under normal humidity for 2 months.

The present invention also includes a film obtained by curing the above composition. The film obtained in the present invention includes the carboxylic acid compound (E). A film formed using the composition of the present invention under normal humidity and high humidity and then cured has a water droplet sliding angle of 25° or less and a haze of 0.10% or less as measured in the examples described later. Further, a film formed under high humidity after storing the composition of the present invention for 60 days at normal temperature under normal humidity, and then cured, has a water droplet sliding angle of 25° or less and a haze of 0.10% or less as measured in the examples described later. In addition, the film formed under high humidity using the composition of the present invention and then cured is preferably a film having a water droplet sliding speed of 90.0 mm/sec or more. The film formed under normal humidity using the composition of the present invention and then cured is preferably a film having a water droplet sliding speed of 80 mm/sec or more (particularly 90 mm/sec or more), and the film formed under high humidity after storing the composition of the present invention for 60 days at normal temperature under normal humidity, and then cured, is preferably a film having a water droplet sliding speed of 80 mm/sec or more (more preferably 85 mm/sec or more, further preferably 90 mm/sec or more).

The film obtained by curing the composition of the present invention can be formed by, for example, bringing the composition of the present invention into contact with a base material and then curing the composition. It is preferable that the obtained coating is further dried. The film thickness of the coating can be, for example, about 1 to 50 nm.

The base material that the composition of the present invention is brought into contact with is not particularly limited, and the shape of the base material may be a flat surface, a curved surface, or a three-dimensional structure in which a number of surfaces are combined.

The material of the base material is not limited, and may be composed of either an organic material or an inorganic material. Examples of the organic materials include thermoplastic resins such as acrylic resin, polycarbonate resin, polyester resin, styrene resin, acrylic-styrene copolymer resin, cellulose resin, and polyolefin resin; and thermosetting resins such as phenol resin, urea resin, melamine resin, epoxy resin, unsaturated polyester, silicone resin, and urethane resin. Examples of the inorganic materials include ceramics; glass; metals such as iron, silicon, copper, zinc, and aluminum; and alloys that include the above metals.

The base material may be subjected to an easy-adhesion treatment in advance. Examples of the easy-adhesion treatment include hydrophilic treatments such as a corona treatment, a plasma treatment, and an ultraviolet treatment. Further, the base material may also be subjected to a primer treatment with a resin, a silane coupling agent, tetraalkoxysilane, or the like, or a glass coating such as polysilazane may be applied to the base material in advance.

Examples of the method of bringing the composition of the present invention into contact with the base material include a method of coating the composition onto the base material. Specifically, a spin coating method, a dip coating method, a spray coating method, a roll coating method, a bar coating method, applying by hand (method in which a liquid is impregnated into a cloth or the like and applied onto the base material), pouring (method in which a liquid is applied as it is onto the base material using a dropper or the like), a spraying method (method in which a spray is used to apply onto the base material), and the like. In particular, from the viewpoint of workability, a spray coating method, applying by hand, pouring, and spraying are preferable, and applying by hand or spraying is more preferable.

Examples of the method for forming the coating on the base material include leaving the composition of the present invention to stand in air at normal temperature (for example, 10 minutes to 48 hours), or to heat (for example, at 300° C. or less) the composition of the present invention for about 10 minutes to 30 hours, in a state in which the composition has been brought into contact with the base material. Such methods allow moisture in the air to be taken into the composition, thereby promoting hydrolysis of the hydrolyzable group and polycondensation to form the coating.

The present invention also includes an absorbent body that includes the above composition in an exudable manner. Including the composition in an exudable manner means that the composition included in the absorbent body is exuded when an external force is applied to the absorbent body. Examples of the absorbent body include a porous body such as a sponge, cloth, and felt.

The material of the porous body is not particularly limited as long as it can be easily deformed by an external force and the composition can exude therefrom. For example, nylon, acrylic, polyester, polyurethane, polyethylene, and polypropylene can be used.

The material of the cloth is not particularly limited as long as the composition can be exuded. Examples thereof include woven fabric, knitted fabric, and non-woven fabric. There are no particular restrictions on the type of fiber used as the material for the woven or knitted material, and natural fiber or chemical fiber can be used. As a natural fiber, for example, plant fiber such as cotton and hemp, animal fiber such as wool, silk, and cashmere, and the like can be used. As a chemical fiber, for example, nylon, acrylic, polyester, polyurethane, polyethylene, and polypropylene can be used. Examples of the non-woven fabric include a wet non-woven fabric, a dry pulp non-woven fabric, a dry non-woven fabric, a spunbond non-woven fabric, a melt blown non-woven fabric, and a flashspun non-woven fabric.

EXAMPLES

The present invention will now be described more specifically with reference to examples. The present invention is not limited to the following examples, and can be carried out by making modifications within a range compatible with the gist of the above or the following, those modifications being included in the technical scope of the present invention.

Example 1

(Preparation of Coating Liquid)

In 1.2 ml of isopropyl alcohol, $9.8 \times 10^{-4}$ mol of n-decyltrimethoxysilane and $3.9 \times 10^{-3}$ mol of tetraethyl orthosilicate (tetraethoxysilane) were dissolved, and the mixture was stirred at room temperature for 10 minutes. 1.3 ml of aqueous 0.01 M hydrochloric acid was added dropwise to the obtained solution, and the mixture was then stirred for 1 hour. 1.4 ml of a malonic acid solution diluted with isopropyl alcohol by a factor of 10 in terms of mass ratio was added dropwise to the obtained solution, and the mixture was stirred for 2 hours to obtain a sample solution 1.

The obtained sample solution 1 was diluted with a mixed solution of isopropyl alcohol and water (volume ratio of 280:219) by a factor of 500 in terms of volume ratio to prepare a coating solution 1. The ratio (% by mass) of each compound in the coating solution 1 is as shown in Table 1. The ratios are shown in the same manner in Table 1 or Table 2 for the other examples and comparative examples as well.

(Production of Coating)

A 5×5 cm² glass substrate (EAGLE XG, Corning Incorporated) having a surface that had been activated by an atmospheric pressure plasma treatment was placed so that an angle of elevation was 45°. Using a spray, 0.3 ml of the coating solution 1 was applied on the entire surface of the glass substrate. The application was performed under normal humidity (relative humidity 40%) and under high humidity (relative humidity 70%). After application, the glass substrate was left to stand for 24 hours at normal temperature under normal humidity for curing to form a coating on the glass substrate. The coating was evaluated by the measurement methods described later.

Further, the coating solution 1 was stored for 60 days at normal temperature under normal humidity, then applied in the same manner as above under high humidity (relative humidity 70%) to form a coating on the glass substrate. The coating was evaluated by the measurement methods described later.

Example 2

A coating solution 2 was prepared in the same manner as in the above Example 1, except that the sample solution 1 obtained in the above Example 1 was diluted with a mixed solution of ethanol and water (volume ratio of 557:441) by a factor of 500 in terms of volume ratio.

Coatings were formed in the same manner as in the above Example 1, except that the obtained coating solution 2 was used, by using a spray immediately after the preparation of the coating solution 2 and after storing the coating solution 2 for 60 days at normal temperature under normal humidity. The coatings were evaluated by the measurement methods described later.

Example 3

A coating solution 3 was prepared in the same manner as in the above Example 1, except that the sample solution 1 obtained in the above Example 1 was diluted with a mixed solution of ethanol and water (volume ratio of 10969:1000) by a factor of 30 in terms of volume ratio.

Coatings were formed in the same manner as in the above Example 1, namely, immediately after the preparation of the coating solution 3 and after storing the coating solution 3 for 60 days at normal temperature under normal humidity, except that in the formation of each coating on the glass substrate, the obtained coating solution 3 was impregnated into a Bemcot cloth (registered trademark; clean room wiper manufactured by Asahi Kasei Corporation), and the coating solution 3 was applied by hand onto the glass substrate. The coatings were evaluated by the measurement methods described later.

Example 4

A coating solution 4 was prepared in the same manner as in the above Example 1, except that the sample solution 1 obtained in the above Example 1 was diluted with a mixed solution of isopropyl alcohol and water (volume ratio of 997:200) by a factor of 30 in terms of volume ratio.

Coatings were formed in the same manner as in the above Example 3, except that the obtained coating solution 4 was used, by applying by hand immediately after the preparation of the coating solution 4 and after storing the coating solution 4 for 60 days at normal temperature under normal humidity. The coatings were evaluated by the measurement methods described later.

Example 5

A coating solution 5 was prepared in the same manner as in the above Example 1, except that the sample solution 1 obtained in the above Example 1 was diluted with a mixed solution of isopropyl alcohol and water (volume ratio of 947:250) by a factor of 30 in terms of volume ratio.

Coatings were formed in the same manner as in the above Example 3, except that the obtained coating solution 5 was used, by applying by hand immediately after the preparation of the coating solution 5 and after storing the coating solution 5 for 60 days at normal temperature under normal humidity. The coatings were evaluated by the measurement methods described later.

Example 6

A sample solution 2 was prepared in the same manner as in the above Example 1, except that instead of the $9.8 \times 10^{-4}$ mol of n-decyltrimethoxysilane in the above Example 1, $9.2 \times 10^{-4}$ mol of n-octyltriethoxysilane and $3.7 \times 10^{-3}$ mol of tetraethylorthosilicate were used, and 1.3 ml of the malonic acid solution was added dropwise.

The obtained sample solution 2 was diluted with a mixed solution of isopropyl alcohol and water (volume ratio of 280:219) by a factor of 500 in terms of volume ratio to prepare a coating solution 6.

Coatings were formed in the same manner as in the above Example 1, except that the obtained coating solution 6 was used, by spraying immediately after the preparation of the coating solution 6 and after storing the coating solution 6 for 60 days at normal temperature under normal humidity. The coatings were evaluated by the measurement methods described later.

Example 7

A coating solution 7 was prepared in the same manner as in the above Example 6, except that the sample solution 2 obtained in the above Example 6 was diluted with a mixed solution of isopropyl alcohol and water (volume ratio of 947:250) by a factor of 30 in terms of volume ratio.

Coatings were formed in the same manner as in the above Example 3, except that the obtained coating solution 7 was used, by applying by hand immediately after the preparation of the coating solution 7 and after storing the coating solution 7 for 60 days at normal temperature under normal humidity. The coatings were evaluated by the measurement methods described later.

Example 8

A sample solution 3 was prepared in the same manner as in the above Example 1, except that instead of the $9.8 \times 10^{-4}$ mol of n-decyltrimethoxysilane in the above Example 1, $9.2 \times 10^{-4}$ mol of dodecyltrimethoxysilane and $3.7 \times 10^{-3}$ mol of tetraethylorthosilicate were used, and 1.3 ml of the malonic acid solution was added dropwise.

The obtained sample solution 3 was diluted with a mixed solution of isopropyl alcohol and water (volume ratio of 280:219) by a factor of 500 in terms of volume ratio to prepare a coating solution 8.

Coatings were formed in the same manner as in the above Example 1, except that the obtained coating solution 8 was used, by spraying immediately after the preparation of the coating solution 8 and after storing the coating solution 8 for 60 days at normal temperature under normal humidity. The coatings were evaluated by the measurement methods described later.

Example 9

A coating solution 9 was prepared in the same manner as in the above Example 8, except that the sample solution 3 obtained in the above Example 8 was diluted with a mixed solution of isopropyl alcohol and water (volume ratio of 947:250) by a factor of 30 in terms of volume ratio.

Coatings were formed in the same manner as in the above Example 3, except that the obtained coating solution 9 was used, by applying by hand immediately after the preparation of the coating solution 9 and after storing the coating solution 9 for 60 days at normal temperature under normal humidity. The coatings were evaluated by the measurement methods described later.

Example 10

A sample solution 4 was prepared in the same manner as in the above Example 1, except that 1.9 ml of isopropyl alcohol in which n-decyltrimethoxysilane and tetraethylorthosilicate were dissolved was used, and the 1.4 ml of the malonic acid solution in the above Example 1 was changed to 0.7 ml of an oxalic acid solution. The obtained sample solution 4 was diluted with a mixed solution of isopropyl alcohol and water (volume ratio of 280:219) by a factor of 500 in terms of volume ratio to prepare a coating solution 10.

Coatings were formed in the same manner as in the above Example 1, except that the obtained coating solution 10 was used, by spraying immediately after the preparation of the coating solution 10 and after storing the coating solution 10 for 60 days at normal temperature under normal humidity. The coatings were evaluated by the measurement methods described later.

Example 11

A sample solution 5 was prepared in the same manner as in the above Example 1, except that 1.9 ml of isopropyl alcohol in which n-decyltrimethoxysilane and tetraethylorthosilicate were dissolved was used, and the 1.4 ml of the malonic acid solution in the above Example 1 was changed to 0.7 ml of a tricarballylic acid solution. The obtained sample solution 5 was diluted with a mixed solution of isopropyl alcohol and water (volume ratio of 280:219) by a factor of 500 in terms of volume ratio to prepare a coating solution 11.

Coatings were formed in the same manner as in the above Example 1, except that the obtained coating solution 11 was used, by spraying immediately after the preparation of the coating solution 11 and after storing the coating solution 11 for 60 days at normal temperature under normal humidity. The coatings were evaluated by the measurement methods described later.

Comparative Example 1

In 2.5 ml of isopropyl alcohol, $1.8 \times 10^{-4}$ mol of n-decyltrimethoxysilane and $4.8 \times 10^{-3}$ mol of tetraethyl orthosilicate (tetraethoxysilane) were dissolved, and the mixture was stirred at room temperature for 10 minutes. 1.4 ml of aqueous 0.01 M hydrochloric acid was added dropwise to the obtained solution, and the mixture was then stirred for 24 hours to obtain a comparative sample solution 1.

Coatings were formed in the same manner as in the above Example 1 immediately after preparation of the comparative coating solution 1 and after storage thereof for 60 days at normal temperature under normal humidity, except that in the formation of the coatings on the glass substrate, the coatings were formed by a spin coating method using a spin coater manufactured by Mikasa under conditions of a rotation speed of 3000 rpm and 20 sec. The coatings were evaluated by the measurement methods described later.

Comparative Example 2

In a mixed solution of 0.94 ml of isopropyl alcohol and 0.96 ml of 1-butanol, $1.8 \times 10^{-4}$ mol of n-decyltrimethoxysilane and $3.5 \times 10^{-3}$ mol of tetraethyl orthosilicate (tetraethoxysilane) were dissolved, and the mixture was stirred at room temperature for 10 minutes. 1.0 ml of aqueous 0.01 M hydrochloric acid was added dropwise to the obtained solution, and the mixture was then stirred for 24 hours to obtain a comparative sample solution 2. The comparative sample solution 2 was diluted with isopropyl alcohol by a factor of 30 in terms of volume ratio to obtain a comparative coating solution 2.

Coatings were formed in the same manner as in the above Example 3, except that the obtained comparative coating solution 2 was used, by applying by hand immediately after the preparation of the comparative coating solution 2 and after storing the comparative coating solution 2 for 60 days at normal temperature under normal humidity. The coatings were evaluated by the measurement methods described later.

TABLE 1

| | | | Example 1 | Example 2 | Example 3 | Example 4 | Example 5 | Example 6 | Example 7 |
|---|---|---|---|---|---|---|---|---|---|
| Component (% by mass) | Organosilicon Compound (A) | n-decyltrimethoxysilane | 0.012 | 0.012 | 0.203 | 0.201 | 0.198 | 0 | 0 |
| | | n-octyltriethoxysilane | 0 | 0 | 0 | 0 | 0 | 0.012 | 0.202 |
| | | dodecyltrimethoxysilane | 0 | 0 | 0 | 0 | 0 | 0 | 0 |
| | Metal Compound (B) | tetraethyl orthosilicate | 0.037 | 0.036 | 0.641 | 0.633 | 0.626 | 0.036 | 0.611 |
| | Solvent (C) | isopropyl alcohol | 49.95 | 0.091 | 1.603 | 78.35 | 73.71 | 49.95 | 73.69 |
| | | ethanol | 0 | 49.81 | 86.45 | 0 | 0 | 0 | 0 |
| | | total | 49.95 | 49.90 | 88.05 | 78.35 | 73.71 | 49.95 | 73.69 |
| | Water (D) | | 49.99 | 50.04 | 11.02 | 20.73 | 25.39 | 50.00 | 25.42 |
| | Carboxylic Acid Compound (E) | malonic acid | 0.005 | 0.005 | 0.084 | 0.083 | 0.082 | 0.005 | 0.081 |
| | | oxalic acid | 0 | 0 | 0 | 0 | 0 | 0 | 0 |
| | | tricarballylic acid | 0 | 0 | 0 | 0 | 0 | 0 | 0 |
| Solid Content Concentration | (A) + (B) | | 0.049 | 0.048 | 0.844 | 0.834 | 0.824 | 0.048 | 0.813 |
| | (A) + (B) + (E) | | 0.054 | 0.053 | 0.928 | 0.917 | 0.906 | 0.053 | 0.894 |
| | (A) + (E) | | 0.017 | 0.017 | 0.287 | 0.284 | 0.280 | 0.017 | 0.283 |
| Mass Ratio | (D)/(A) | | 4166 | 4170 | 54.29 | 103.1 | 128.2 | 4166.7 | 125.8 |
| | (D)/(C) | | 1.001 | 1.003 | 0.125 | 0.265 | 0.344 | 1.001 | 0.345 |
| | (E)/[(A) + (B)] | | 0.102 | 0.104 | 0.100 | 0.100 | 0.100 | 0.104 | 0.100 |
| Application Method | | | spraying | spraying | application by hand | application by hand | application by hand | spraying | application by hand |

TABLE 2

| | | | Example 8 | Example 9 | Example 10 | Example 11 | Comparative Example 1 | Comparative Example 2 |
|---|---|---|---|---|---|---|---|---|
| Component (% by mass) | Organosilicon Compound (A) | n-decyltrimethoxysilane | 0 | 0 | 0.012 | 0.012 | 1.074 | 0.054 |
| | | n-octyltriethoxysilane | 0 | 0 | 0 | 0 | 0 | 0 |
| | | dodecyltrimethoxysilane | 0.012 | 0.212 | 0 | 0 | 0 | 0 |
| | Metal Compound (B) | tetraethyl orthosilicate | 0.036 | 0.610 | 0.037 | 0.037 | 22.73 | 0.831 |
| | Solvent (C) | isopropyl alcohol | 49.95 | 73.68 | 49.95 | 49.95 | 44.38 | 97.09 |
| | | ethanol | 0 | 0 | 0 | 0 | 0 | 0 |
| | | total | 49.95 | 73.68 | 49.95 | 49.95 | 44.38 | 97.09 |
| | | Water (D) | 49.99 | 25.41 | 49.99 | 49.99 | 31.82 | 1.140 |
| | Carboxylic Acid Compound (E) | malonic acid | 0.005 | 0.082 | 0 | 0 | 0 | 0 |
| | | oxalic acid | 0 | 0 | 0.002 | 0 | 0 | 0 |
| | | tricarballylic acid | 0 | 0 | 0 | 0.002 | 0 | 0 |
| | Solid Content Concentration | (A) + (B) | 0.048 | 0.822 | 0.049 | 0.049 | 23.80 | 0.885 |
| | | (A) + (B) + (E) | 0.053 | 0.904 | 0.051 | 0.051 | 23.80 | 0.885 |
| | | (A) + (E) | 0.017 | 0.294 | 0.014 | 0.014 | 1.074 | 0.054 |
| Mass Ratio | | (D)/(A) | 4165.8 | 119.9 | 4165.8 | 4165.8 | 29.63 | 21.11 |
| | | (D)/(C) | 1.001 | 0.345 | 1.001 | 1.001 | 0.717 | 0.012 |
| | | (E)/[(A) + (B)] | 0.104 | 0.100 | 0.041 | 0.041 | — | — |
| Application Method | | | spraying | application by hand | spraying | spraying | spin coating | application by hand |

The coatings obtained in the above examples and comparative examples were evaluated based on the following items.

(Contact Angle)

The contact angle of the coating surface was measured by a droplet method (analysis method: θ/2 method, water droplet amount: 3.0 μL) using a contact angle measuring device (DM700, manufactured by Kyowa Interface Science Co., Ltd.). A larger contact angle value is better.

(Sliding Angle)

The dynamic water repellency (contact angle hysteresis, sliding angle) of the coating surface was measured by a sliding method (analysis method: tangential method, water droplet amount: 6.0 μL, tilting method: continuous tilting, slipping detection: after sliding, movement determination: forward angle, sliding determination distance of 0.25 mm) using a contact angle measuring device (DM700, manufactured by Kyowa Interface Science Co., Ltd.). A smaller sliding angle value is better.

(Haze)

The haze (cloudiness) of the coating surface was measured with a D65 light source (average daylight) using a haze meter HZ-2 (Suga tester). A smaller haze value (%) is better.

(Sliding Speed)

Using a contact angle measuring device (DM700, manufactured by Kyowa Interface Science Co., Ltd.), a 50 μL water droplet was dropped onto the coating surface on a substrate tilted at 20°, the time taken for the water droplet to slide 1.5 cm from the initial dropping position was measured, and the sliding speed of the water droplet on the coating surface was calculated. A larger sliding speed value of the water droplet is better.

The evaluation results of the coatings obtained in the above examples and comparative examples are shown in Table 3 or Table 4 below.

TABLE 3

| Evaluated Item | Solution | Application condition | Example 1 | Example 2 | Example 3 | Example 4 | Example 5 | Example 6 | Example 7 |
|---|---|---|---|---|---|---|---|---|---|
| Contact Angle (°) | Immediately After Preparation | Under normal humidity (RH 40%) | 109.5 | 109.6 | 108.7 | 108.6 | 109.6 | 108.3 | 108.7 |
| | Immediately After Preparation | Under high humidity (RH 70%) | 108.5 | 108 | 109.4 | 108.7 | 109.5 | 108.2 | 106.9 |
| | After Storage for 60 Days | Under high humidity (RH 70%) | 108.0 | 107.7 | 107.5 | 109.2 | 109.5 | 107 | 107.9 |
| Sliding Angle (°) | Immediately After Preparation | Under normal humidity (RH 40%) | 13.0 | 15.0 | 17.0 | 24.7 | 12.0 | 11.7 | 14.7 |
| | Immediately After Preparation | Under high humidity (RH 70%) | 17.0 | 22.0 | 25.0 | 21.7 | 15.3 | 14.0 | 16.7 |
| | After Storage for 60 Days | Under high humidity (RH 70%) | 20.3 | 18.7 | 18.3 | 16.0 | 15.0 | 21.0 | 18.0 |
| Haze (%) | Immediately After Preparation | Under normal humidity (RH 40%) | 0.06 | 0.07 | 0.05 | 0.06 | 0.07 | 0.09 | 0.09 |
| | Immediately After Preparation | Under high humidity (RH 70%) | 0.06 | 0.04 | 0.05 | 0.07 | 0.07 | 0.09 | 0.08 |
| | After Storage for 60 Days | Under high humidity (RH 70%) | 0.07 | 0.04 | 0.09 | 0.08 | 0.09 | 0.08 | 0.09 |
| Sliding Speed (mm/sec) | Immediately After Preparation | Under normal humidity (RH 40%) | 93.5 | 86.0 | 85.1 | 83.6 | 112.7 | 112.9 | 104.0 |
| | Immediately After Preparation | Under high humidity (RH 70%) | 92.7 | 96.8 | 98.7 | 96.7 | 91.6 | 100.2 | 101.3 |
| | After Storage for 60 Days | Under high humidity (RH 70%) | 88.7 | 92.2 | 92.4 | 93.6 | 90.8 | 86.7 | 91.6 |

TABLE 4

| Evaluated Item | Solution | Application condition | Example 8 | Example 9 | Example 10 | Example 11 | Comparative Example 1 | Comparative Example 2 |
|---|---|---|---|---|---|---|---|---|
| Contact Angle (°) | Immediately After Preparation | Under normal humidity (RH 40%) | 108.7 | 109.8 | 108.1 | 108.0 | 109.0 | 103.3 |
| | Immediately After Preparation | Under high humidity (RH 70%) | 108.8 | 108.6 | 107.4 | 108.8 | 106.9 | 101.0 |
| | After Storage for 60 Days | Under high humidity (RH 70%) | 109.3 | 109.5 | 107.1 | 108.9 | 85.8 | 85.8 |
| Sliding Angle (°) | Immediately After Preparation | Under normal humidity (RH 40%) | 18.0 | 19.3 | 15.0 | 19.0 | 20.7 | 19.3 |
| | Immediately After Preparation | Under high humidity (RH 70%) | 17.0 | 19.7 | 21.5 | 16.0 | 34.3 | 25.0 |
| | After Storage for 60 Days | Under high humidity (RH 70%) | 19.7 | 24.3 | 24.5 | 14.0 | >50 | 30.3 |
| Haze (%) | Immediately After Preparation | Under normal humidity (RH 40%) | 0.08 | 0.09 | 0.07 | 0.09 | 0.03 | 0.05 |
| | Immediately After Preparation | Under high humidity (RH 70%) | 0.04 | 0.09 | 0.09 | 0.05 | 0.46 | 0.11 |
| | After Storage for 60 Days | Under high humidity (RH 70%) | 0.09 | 0.09 | 0.05 | 0.07 | 1.09 | 0.50 |
| Sliding Speed (mm/sec) | Immediately After Preparation | Under normal humidity (RH 40%) | 96.9 | 89.4 | 86.0 | 83.1 | 84.8 | 87.7 |
| | Immediately After Preparation | Under high humidity (RH 70%) | 99.2 | 90.0 | 90.0 | 92.1 | 88.9 | 83.0 |
| | After Storage for 60 Days | Under high humidity (RH 70%) | 93.6 | 92.4 | 89.4 | 90.2 | 10.0 | 33.6 |

The coatings formed using the coating solutions obtained in Examples 1 to 11 were coatings having a good performance when formed under either a normal temperature environment or a high humidity environment, with water droplet sliding angles of 25° or less and haze 0.10% or less. In addition, the coating solutions obtained in Examples 1 to 11 had good storage stability, and could provide coatings having a good performance even when formed under high humidity after storage of the coating solutions for 60 days at normal temperature under normal humidity, with water droplet sliding angles of 25° or less and haze of 0.10% or less. On the other hand, although the coatings formed using the comparative sample solution 1 obtained in Comparative Example 1 or the comparative coating solution 2 obtained in Comparative Example 2 exhibited a good performance when formed under normal temperature environment, when formed under high humidity, the performance of those coatings was not as good as the coatings formed using the coating solutions obtained in Examples 1 to 11 at least in terms of either their water droplet sliding angle or haze. Moreover, the comparative sample solution 1 and the comparative coating solution 2 obtained in Comparative Examples 1 and 2 had poor storage stability, and when the comparative sample solution 1 and the comparative coating solution 2 were stored for 60 days at normal temperature under normal humidity, coatings formed under high humidity did not exhibit as good a performance as the coatings formed using the coating solutions obtained in Examples 1 to 11 in terms of both water droplet sliding angle and haze.

INDUSTRIAL APPLICABILITY

By using the composition of the present invention, a good coating, that is, a coating having good water repellency, good water droplet sliding properties, and good transparency, can be formed not only under normal humidity but also under high humidity. Further, the composition of the present invention has excellent storage stability. Therefore, a base material treated using the composition of the present invention is useful as a base material in display devices such as touch panel displays, optical elements, semiconductor elements, building materials, automobile parts, and nanoimprint technology. In addition, a coating formed from the composition of the present invention can be suitably used for articles such as a body in transportation machinery, such as trains, automobiles, ships, and aircraft, window glass (windshields, side windows, rear windows), mirrors, and bumpers. The composition of the present invention can also be used for outdoor applications such as the external walls of a building, tents, solar power generation modules, sound insulation boards, and concrete, as well as for fishing nets, insect nets, aquariums, and the like. Furthermore, the composition of the present invention can be used for articles of various members in kitchens, bathrooms, washbasins, mirrors, toilet vicinity, as well as for various indoor equipment such as chandeliers, ceramics such as tiles, artificial marble, and air conditioners. The composition of the present invention can also be used as an antifouling treatment for jigs, inner walls, pipes, and the like in factories. The composition of the present invention can also be suitably used for goggles, spectacles, helmets, pachinko, textiles, umbrellas, playground equipment, soccer balls and the like. Furthermore, the composition of the present invention can be used as an anti-adhesive agent for various packaging materials, such as food packaging materials, cosmetic packaging materials, and pot interiors.

The invention claimed is:

1. A mixed composition comprising:
an organosilicon compound (A) represented by the following formula (a1);
a solvent (C);
water (D); and
a carboxylic acid compound (E),
wherein the mixed composition has a mass ratio (D/A) of the water (D) to the organosilicon compound (A) of 30.0 or more

[Formula 1]

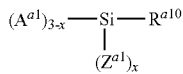
(a1)

(wherein a plurality of $A^{a1}$ each independently represent a hydrolyzable group;
$Z^{a1}$ represents a hydrocarbon chain-containing group;
x is 0 or 1;
$R^{a10}$ represents an alkyl group having 6 to 20 carbon atoms, in which a part of methylene groups constituting the alkyl group may be replaced with an oxygen atom, and one or more hydrogen atoms may be replaced with a fluorine atom; and $Z^{a1}$ and $R^{a10}$ may be the same or different) and
wherein a metal compound (B) represented by the following formula (b1)

$$M(R^{b10})_r(A^{b1})_{m-r} \quad (b1)$$

wherein
M represents Al, Fe, In, Ge, Hf, Si, Ti, Sn, Zr, or Ta, $R^{b10}$ represents a hydrocarbon chain-containing group having 1 to 5 carbon atoms;
r is 0 or 1;
a plurality of $A^{b1}$ each independently represent a hydrolyzable group; and m denotes an integer of 3 to 5 depending on the metal atom M)
is mixed.

2. The composition according to claim 1, wherein the organosilicon compound (A) is a compound represented by the following formula (a1-2)

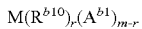
(a1-2)

(wherein
a plurality of $A^{a1}$ each independently represent a hydrolyzable group; and
$R^{a11}$ represents an alkyl group having 6 to 20 carbon atoms in which a hydrogen atom may be substituted with a fluorine atom).

3. The composition according to claim 1, wherein the solvent (C) is an alcohol solvent.

4. The composition according to claim 1, wherein a mass ratio (D/C) of the water (D) to the solvent (C) is 0.1 or more.

5. The composition according to claim 1, wherein the carboxylic acid compound (E) is a polyvalent carboxylic acid compound.

6. The composition according to claim 1, wherein the carboxylic acid compound (E) is a compound represented by the following formula (e1)

[Formula 2]

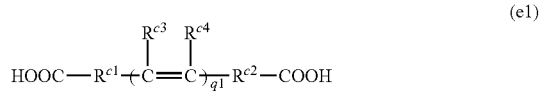
(e1)

(wherein
$R^{c1}$ and $R^{c2}$ are each independently represent a single bond, a divalent aliphatic hydrocarbon group having 1 to 10 carbon atoms optionally having a carboxy group, or a divalent aromatic hydrocarbon group having 6 to 10 carbon atoms optionally having a carboxy group;
$R^{c3}$ and $R^{c4}$ each independently represent an alkyl group having 1 to 10 carbon atoms optionally having a carboxy group, or a hydrogen atom; and
$q^1$ is 0 or 1).

7. An absorbent body comprising the mixed composition according to claim 1 in an exudable manner.

8. A film obtained by curing the mixed composition according to claim 1.

9. The film according to claim 8, wherein a sliding speed of a water droplet is 90.0 mm/sec or more.

10. An absorbent body comprising the following mixed composition in an exudable manner:
an organosilicon compound (A) represented by the following formula (a1);
a solvent (C);
water (D); and
a carboxylic acid compound (E),
wherein the mixed composition has a mass ratio (D/A) of the water (D) to the organosilicon compound (A) of 30.0 or more

[Formula 1]

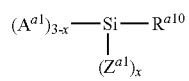
(a1)

(wherein a plurality of $A^{a1}$ each independently represent a hydrolyzable group;
$Z^{a1}$ represents a hydrocarbon chain-containing group;
x is 0 or 1;
$R^{a10}$ represents an alkyl group having 6 to 20 carbon atoms, in which a part of methylene groups constituting the alkyl group may be replaced with an oxygen atom, and one or more hydrogen atoms may be replaced with a fluorine atom; and $Z^{a1}$ and $R^{a10}$ may be the same or different).

11. The absorbent body according to claim 10, wherein in the mixed composition: the organosilicon compound (A) is a compound represented by the following formula (a 1-2)

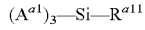
(a1-2)

(wherein
a plurality of $A^{a1}$ each independently represent a hydrolyzable group; and
$R^{a11}$ represents an alkyl group having 6 to 20 carbon atoms in which a hydrogen atom may be substituted with a fluorine atom).

12. The absorbent body according to claim 10, wherein in the mixed composition: the solvent (C) is an alcohol solvent.

13. The absorbent body according to claim 10, wherein in the mixed composition: a mass ratio (D/C) of the water (D) to the solvent (C) is 0.1 or more.

14. The absorbent body according to claim 10, wherein in the mixed composition: the carboxylic acid compound (E) is a polyvalent carboxylic acid compound.

15. The absorbent body according to claim 10, wherein in the mixed composition: the carboxylic acid compound (E) is a compound represented by the following formula (e1)

[Formula 2]

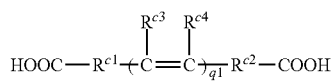

(e1)

(wherein
$R^{c1}$ and $R^{c2}$ are each independently represent a single bond, a divalent aliphatic hydrocarbon group having 1 to 10 carbon atoms optionally having a carboxy group, or a divalent aromatic hydrocarbon group having 6 to 10 carbon atoms optionally having a carboxy group;
$R^{c3}$ and $R^{c4}$ each independently represent an alkyl group having 1 to 10 carbon atoms optionally having a carboxy group, or a hydrogen atom; and
$q^1$ is 0 or 1).

* * * * *